(12) United States Patent
Saito

(10) Patent No.: US 10,725,166 B2
(45) Date of Patent: Jul. 28, 2020

(54) RADAR APPARATUS AND BUMPER STATE DETERMINATION METHOD

(71) Applicant: Panasonic Intellectual Property Management Co., Ltd., Osaka (JP)

(72) Inventor: Noriaki Saito, Tokyo (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 369 days.

(21) Appl. No.: 15/605,645

(22) Filed: May 25, 2017

(65) Prior Publication Data

US 2017/0350970 A1 Dec. 7, 2017

(30) Foreign Application Priority Data

Jun. 1, 2016 (JP) ................................ 2016-110027

(51) Int. Cl.
*G01S 13/42* (2006.01)
*G01S 13/931* (2020.01)
*G01S 7/40* (2006.01)

(52) U.S. Cl.
CPC ............... *G01S 13/42* (2013.01); *G01S 7/40* (2013.01); *G01S 13/931* (2013.01); *G01S 2007/4039* (2013.01); *G01S 2013/93275* (2020.01)

(58) Field of Classification Search
None
See application file for complete search history.

(56) References Cited

U.S. PATENT DOCUMENTS

| 2005/0125127 A1* | 6/2005 | Bomar, Jr. | G06Q 99/00 701/45 |
| 2010/0033365 A1* | 2/2010 | Kishida | G01S 13/42 342/70 |

(Continued)

FOREIGN PATENT DOCUMENTS

| JP | 2002-071788 A | 3/2002 |
| JP | 2006-017622 A | 1/2006 |

(Continued)

OTHER PUBLICATIONS

Japanese Office Action dated Dec. 17, 2019 for the related Japanese Patent Application No. 2016-110027.

(Continued)

*Primary Examiner* — Whitney Moore
(74) *Attorney, Agent, or Firm* — Seed IP Law Group LLP

(57) ABSTRACT

A radar apparatus includes: a transmission processor which transmits first wave signals from inside of the bumper toward outside, the transmission processor being provided inside of the bumper; a reception processor which receives an object-reflected wave signal that is a reflection of the first wave signals by a target in an area around the vehicle, a bumper-reflected wave signal that is a reflection of the first wave signals by the bumper, and a transmission and reception leak signal of the first wave signals and detects the target through the object-reflected wave signal; and a bumper determiner which detects a first reception level of a second wave signal including the bumper-reflected wave signal and the transmission and reception leak signal, compares the first reception level with a threshold, and determines the presence of a bad bumper state in a case where the first reception level is higher than the threshold.

6 Claims, 4 Drawing Sheets

(56) References Cited

U.S. PATENT DOCUMENTS

2013/0141269 A1* 6/2013 Schneider ............ H01Q 1/3233
                                                                    342/70
2017/0170560 A1* 6/2017 Ookawa ................ G01S 13/931

FOREIGN PATENT DOCUMENTS

JP          2007-093480  A      4/2007
JP          2008-032495  A      2/2008

OTHER PUBLICATIONS

Notice of Reasons for Refusal in Japan dated Jun. 9, 2020 for the related Japanese Patent Application No. 2016-110027.

* cited by examiner

RADAR APPARATUS AND BUMPER STATE DETERMINATION METHOD

BACKGROUND

1. Technical Field

The present disclosure relates to a radar apparatus and a bumper state determination method for determining a state of a bumper of a vehicle.

2. Description of the Related Art

There has recently been progress in the development of a radar apparatus using a millimeter-wave band (76 to 81 GHz) or the like for an application purpose of monitoring the surrounding areas, as well as the front, of a vehicle.

In considering designing a radar apparatus that is mounted on a vehicle, the influence of reflections from various types of structures (hereinafter referred to as "nearby structures") provided near an antenna of the radar apparatus has been taken into account.

For example, Japanese Patent No. 4653621 discloses a radar apparatus that can eliminate the influence of a reflection from a radome, which is a nearby structure, of the radar apparatus.

Examples of nearby structures include a bumper of a vehicle in addition to the radome. Since the bumper is an exterior component of the vehicle, the bumper may be painted, for example, for the purpose of mending a flaw or a scratch. The bumper, painted for mending, may undesirably strongly reflect, toward the inside of the bumper, radio waves sent from a radar apparatus provided inside of the bumper. This reflection occurs, for example, due to a component of the paint or the thickness of the coat of paint. This results in a reduction in electric power of a detection wave that is emitted to the outside of the bumper. This causes the radar apparatus to suffer from performance degradations such as a decrease in reception level of a reflected wave from an object to be detected and a decrease in accuracy of the angle of arrival of the reflected wave.

SUMMARY

One non-limiting and exemplary embodiment facilitates providing a radar apparatus and a state determination method that make it possible to detect a state of a bumper that becomes a factor in degrading the performance of the radar apparatus.

In one general aspect, the techniques disclosed here feature a radar apparatus including: a transmission processor, which transmits first wave signals from inside of the bumper toward outside, the transmission processor being provided inside of the bumper; a reception processor that receives an object-reflected wave signal that is a reflection of the first wave signals by a target in an area around the vehicle, a bumper-reflected wave signal that is a reflection of the first wave signals by the bumper, and a transmission and reception leak signal of the first wave signals and detects the target through the object-reflected wave signal; and a bumper determiner that detects a first reception level of a second wave signal including the bumper-reflected wave signal and the transmission and reception leak signal, compares the first reception level with a threshold, and determines the presence of a bad bumper state in a case where the first reception level is higher than the threshold.

An aspect of the present disclosure makes it possible to detect a state of a bumper that becomes a factor in degrading the performance of a radar apparatus.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

An embodiment of the present disclosure is described below with reference to the drawings. It should be noted that the embodiment to be described below is an example and the present disclosure is not limited by the following embodiment.

Embodiment

Figure 1:
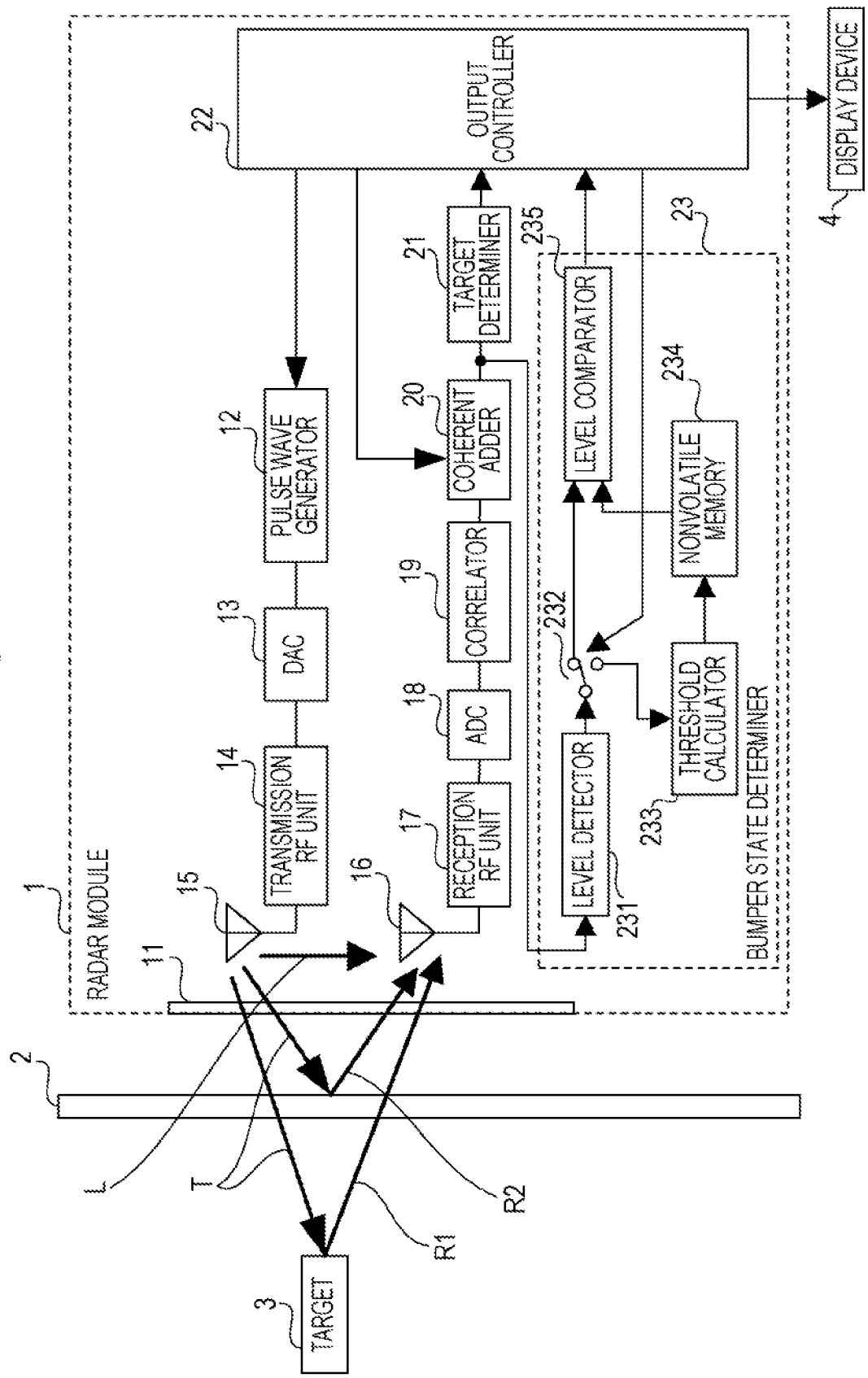
FIG. 1 is a block diagram showing an example of a configuration of a radar module according to an embodiment of the present disclosure.

FIG. 1 is a block diagram showing an example of a configuration of a radar module 1 according to the present embodiment. In FIG. 1, the radar module 1 is provided inside of a bumper 2 of a vehicle. The radar module 1 performs a detection process including transmitting wave signals to be transmitted T (hereinafter referred to as first wave signals T) toward a target 3, which is an object to be detected (e.g. a vehicle traveling ahead) that is present outside of the vehicle, receiving a received wave R1 reflected by the target 3, and detecting the target 3 on the basis of the received wave R1.

In addition to the process for detecting the target 3, the radar module 1 performs a state detection process for detecting whether a state of the bumper 2 that becomes a factor in degrading the performance of the radar module 1, e.g. the level of a reflected signal (bumper reflection) toward the inside of the bumper 2, exceeds a predetermined threshold and a threshold calculation process for calculating the threshold that is used in the state detection process. A state in which the level of a bumper reflection exceeds the predetermined threshold is hereinafter referred to as "bad bumper state". It should be noted that a state preceding bumper mending is referred to as "good bumper state".

The radar module 1 includes a radome 11, a pulse wave generator 12, a digital-to-analog converter (DAC) 13, a transmission radio frequency (RF) unit 14, a transmitting antenna 15, a receiving antenna 16, a reception RF unit 17, an analog-to-digital converter (ADC) 18, a correlator 19, a coherent adder 20, a target determiner 21, an output controller 22, and a bumper state determiner 23.

The radome (which is the abbreviation of "radar dome") 11 is provided to protect the transmitting antenna 15 and the receiving antenna 16 and retain durability and waterproofness. The radome 11 is a resin cover made of a material that allows easy passage of radio waves. The radome 11 is installed with the transmitting antenna 15 and the receiving antenna 16 having their angles adjusted so that reflection of radio waves is prevented.

The pulse wave generator 12 generates a determined pulse-compression code. The pulse wave generator 12 outputs the pulse-compression code thus generated to the digital-to-analog converter (DAC) 13.

The DAC 13 converts the digital pulse-compression code into a baseband analog signal and outputs the baseband analog signal thus obtained to the transmission radio frequency (RF) process unit 14.

The transmission RF unit 14 converts the baseband analog signal into a millimeter-wave signal and performs a predetermined transmission process such as amplification of the signal. The transmission RF unit 14 outputs, to the transmitting antenna 15, the millimeter-wave signal subjected to the transmission process.

The transmitting antenna 15 transmits the millimeter-wave signal as the first wave signals T.

The pulse wave generator 12, the DAC 13, the transmission RF unit 14, and the transmitting antenna 15 function as a transmission processor that transmits the first wave signals T. In detecting the target 3, the transmission processor transmits the first wave signals T in a case where the bumper state determiner 23 has received, from the output controller 22, an instruction to perform the threshold calculation process or the state determination process.

The receiving antenna 16 receives a reflected wave R1 (object-reflected wave signal), which is a reflection of the first wave signals T by the target 3, and a reflected wave R2 (bumper-reflected wave signal), which is a reflection of the first wave signals T by the bumper 2. Further, while the transmitting antenna 15 is transmitting the first wave signals T, the receiving antenna 16 receives some of the first wave signals T directly from the transmitting antenna 15. Radio waves that the receiving antenna 16 receives directly from the transmitting antenna 15 are referred to as a transmission and reception leak signal L.

The receiving antenna 16 receives received waves including the reflected wave R1, the reflected wave R2, and the transmission and reception leak signal L. The receiving antenna 16 outputs a signal of the received waves thus received to the reception RF unit 17.

The reception RF unit 17 performs a predetermined reception process for converting, into a baseband, the frequency band of the signal of the received waves acquired from the receiving antenna 16 and outputs, to the ADC 18, the baseband analog signal subjected to the reception process.

The ADC 18 converts, into a digital signal, the baseband analog signal acquired from the reception RF unit 17.

The correlator 19 performs a correlation process between the digital signal acquired from the ADC 18 and the determined pulse-compression code and outputs a processing result to the coherent adder 20.

The coherent adder 20 performs a predetermined number of coherent additions on the processing result acquired from the correlator 19 and generates a delay profile that indicates a delay time of a reflected wave or the like included in the received waves.

The target determiner 21 determines the presence or absence of the target 3 on the basis of whether the delay profile includes a reflected wave from the target 3. Then, the target determiner 21 calculates the distance to the target 3 on the basis of the delay time of the reflected wave from the target 3 as indicated by the delay profile.

The receiving antenna 16, the reception RF unit 17, the ADC 18, the correlator 19, the coherent adder 20, and the target determiner 21 function as a reception processor that performs a reception process on the received waves, generates a delay profile, and detects the target 3. Further, in a case where the bumper state determiner 23 has received, from the output controller 22, an instruction to perform the threshold calculation process or the state determination process, the reception processor performs the reception process on the received waves and generates a delay profile.

It should be noted that the coherent adder 20 outputs the delay profile thus generated to the target determiner 21 in detecting the target 3. Upon receiving, from the output controller 22, an instruction to perform the threshold calculation process or the state determination process, the coherent adder 20 outputs the delay profile thus generated to the bumper state determiner 23.

The output controller 22 acquires, from the target determiner 21, information indicating the presence or absence of the target 3 and the distance to the target 3 and outputs the information to a display device 4. Further, the output controller 22 outputs, to the pulse wave generator 12 of the transmission processor, the coherent adder 20 of the reception processor, and the after-mentioned switch 232 of the bumper state determiner 23, an instruction to perform the threshold calculation process or the state determination process.

The display device 4 is for example a display that is provided in such a position as to be easily seen by a driver of the vehicle. The display device 4 acquires, from the output controller 22, information indicating the distance to the target 3, which is present in an area around the vehicle, and draws the driver's attention by displaying the information.

It should be noted that the destination of the information that is outputted from the output controller 22 is not limited to the display device 4. For example, the output controller 22 may output, to an automated driving system (not illustrated), information indicating the distance to the target 3 detected.

The bumper state determiner 23 performs the threshold calculation process or the state determination process in accordance with an instruction from the output controller 22.

The bumper state determiner 23 includes a level detector 231, a switch 232, a threshold calculator 233, a nonvolatile memory 234, and a level comparator 235.

The level detector 231 detects a level that indicates the magnitude of a received wave (second wave signal) including at least the transmission and reception leak signal L included in the delay profile acquired from the coherent adder 20. The level detector 231 outputs the level thus detected to the threshold calculator 233 or the level comparator 235 by switching the switch 232.

Upon acquiring, from the output controller 22, an instruction to perform the threshold calculation process, the switch 232 switches into a state of connecting the level detector 231 to the threshold calculator 233. Upon acquiring, from the output controller 22, an instruction to perform the state determination process, the switch 232 switches into a state of connecting the level detector 231 to the level comparator 235.

It should be noted that the threshold calculation process is executed in a preparatory mode in which the receiving antenna 16 does not receive the reflected waver R2 from the bumper 2 or the reflected wave R1 from the target 3. Therefore, in a case where the switch 232 connects the level detector 231 to the threshold calculator 233, the level that is outputted from the level detector 231 to the threshold calculator 233 is a transmission and reception leak signal level that indicates the magnitude of the transmission and reception leak signal L. Meanwhile, the state determination process is executed in an inspection mode in which the receiving antenna 16 receives the reflected wave R2 from the bumper 2. Therefore, in a case where the switch 232 connects the level detector 231 to the level comparator 235, the level that is outputted from the level detector 231 to the level comparator 235 is the level of the second wave signal (second wave signal level), which is a combination of the transmission and reception leak signal L and the bumper-reflected wave signal.

In performing the threshold calculation process, the threshold calculator 233 is connected to the level detector 231 by the switch 232 and acquires the transmission and reception leak signal level from the level detector 231. The threshold calculator 233 calculates the threshold on the basis of the transmission and reception leak signal level. The threshold calculator 233 stores the threshold thus calculated in the nonvolatile memory 234. It should be noted that the threshold calculation process will be described in detail later.

In performing the state determination process, the level comparator 235 is connected to the level detector 231 by the switch 232 and acquires the second wave signal level from the level detector 231. Further, the level comparator 235 reads out the threshold stored in the nonvolatile memory 234. Then, the level comparator 235 compares the second wave signal level with the threshold and, in a case where the second wave signal level is higher than the threshold, determines the presence of a bad bumper state. The level comparator 235 outputs, to the output controller 22, a determination result indicating the presence or absence of a bad bumper state. It should be noted that the state determination process will be described in detail later.

Upon acquiring, from the level comparator 235, a determination result indicating the presence of a bad bumper state, the output controller 22 outputs the determination result to the display device 4. For example, the output controller 22 outputs, to the display device 4, a warning display indicating the presence of the bad bumper state.

The display device 4 draws the driver's attention by displaying a warning indicating that, due to the bad bumper state, the radar apparatus is not operating normally.

Next, examples of the threshold calculation process and the state determination process in the bumper state determiner 23 are described with reference to FIGS. 2A to 2C.

Figure 2A:
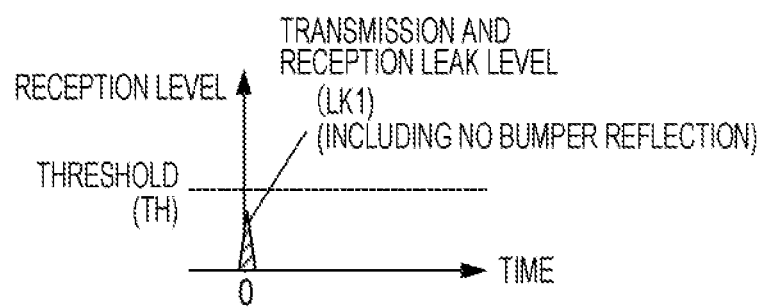
FIG. 2A is a diagram showing an example of a delay profile in a threshold calculation process.

FIG. 2A is a diagram showing an example of a delay profile in the threshold calculation process. FIG. 2B is a diagram showing a first example of a delay profile in the state determination process. FIG. 2C is a diagram showing a second example of a delay profile in the state determination process. In each of FIGS. 2A to 2C, the horizontal axis represents time, and the vertical axis represents a reception level indicated by the delay profile.

The threshold calculation process is executed in the preparatory mode, in which the receiving antenna 16 does not receive the reflected waver R2 (bumper reflection) from the bumper 2 or the reflected wave R1 (target reflection) from the target 3. Therefore, the delay profile shown in FIG. 2A does not include a target reflection. Further, the transmission and reception leak signal (second received wave) of the delay profile shown in FIG. 2A does not include a bumper reflection.

Meanwhile, the state determination process is executed in the inspection mode, in which the receiving antenna 16 receives a bumper reflection and a target reflection. Therefore, each of the delay profiles shown in FIGS. 2B and 2C includes a target reflection. Further, the second wave signal of each of the delay profiles shown in FIGS. 2B and 2C includes a bumper reflection.

It should be noted that in a case where the state determination process is executed in the inspection mode, in which no target is present in the range of detection of the radar module 1, the delay profile does not include a target reflection.

In the threshold calculation process, the level detector 231 acquires the delay profile shown in FIG. 2A from the coherent adder 20. Then, the level detector 231 detects, from the delay profile, a transmission and reception leak signal level LK1 indicating the magnitude of the transmission and reception leak signal L. Then, the level detector 231 outputs the transmission and reception leak signal level LK1 to the threshold calculator 233 via the switch 232.

The threshold calculator 233 calculates the threshold on the basis of the transmission and reception leak signal level LK1. For example, the threshold calculator 233 calculates the threshold in view of the performance limit of target detection of the radar module 1.

Specifically, a transmission and reception leak signal is a component of first wave signals that is directly received by the receiving antenna 16 without passing through a bumper. For this reason, in a case where the reception level of a transmission and reception leak signal is higher than a predetermined value, the level of a reflected wave from a target is hidden behind the floor noise of the transmission and reception leak signal, which makes it difficult to detect the level of the reflected wave. Therefore, the threshold calculator 233 sets such an allowed value of a transmission and reception leak signal that the reception level of a reflected wave from a target within the range of detection does not fall short of the lowest level at which a determination can be made in a target detection process, and calculates the threshold using the allowed value thus set and the transmission and reception leak signal level LK1.

Alternatively, the threshold calculator 233 may calculate, as the threshold, a level obtained by adding, to the transmission and reception leak signal level LK1, a variation in level due to a reflected wave from a premeasured good bumper state (e.g. a bumper to be mended or repaired).

Figure 2B:
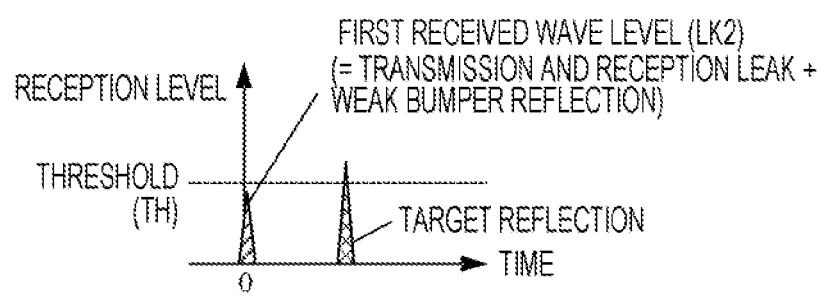
FIG. 2B is a diagram showing a first example of a delay profile in a state determination process.
Figure 2C:
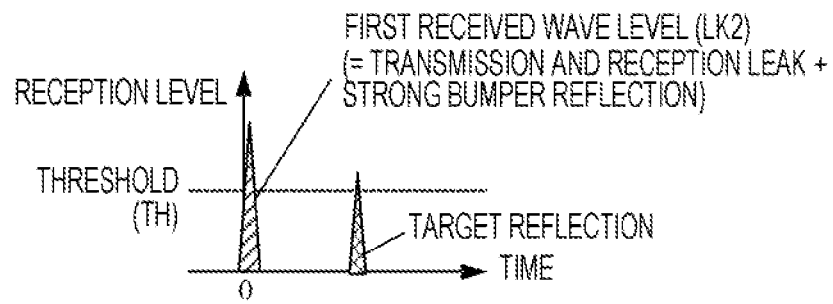
FIG. 2C is a diagram showing a second example of a delay profile in the state determination process.

In performing the state determination process, the level detector 231 acquires a delay profile such as that shown in FIG. 2B or 2C from the coherent adder 20. Then, the level detector 231 separates the second wave signal and the target reflection from the delay profile. Then, the level detector 231 detects a second wave signal level LK2 indicating the magnitude of the second wave signal. Then, the level detector 231 outputs the second wave signal level LK2 to the level comparator 235 via the switch 232.

The level comparator 235 compares the second wave signal level LK2 with the threshold TH. Then, in a case where the second wave signal level LK2 is equal to or lower than the threshold TH as shown in FIG. 2B, the level comparator 235 determines the presence of a good bumper state. On the other hand, in a case where the second wave signal level LK2 is higher than the threshold TH as shown in FIG. 2C, the level comparator 235 determines the presence of a bad bumper state.

Next, the flow of the threshold calculation process is described with reference to FIG. 3.

Figure 3:
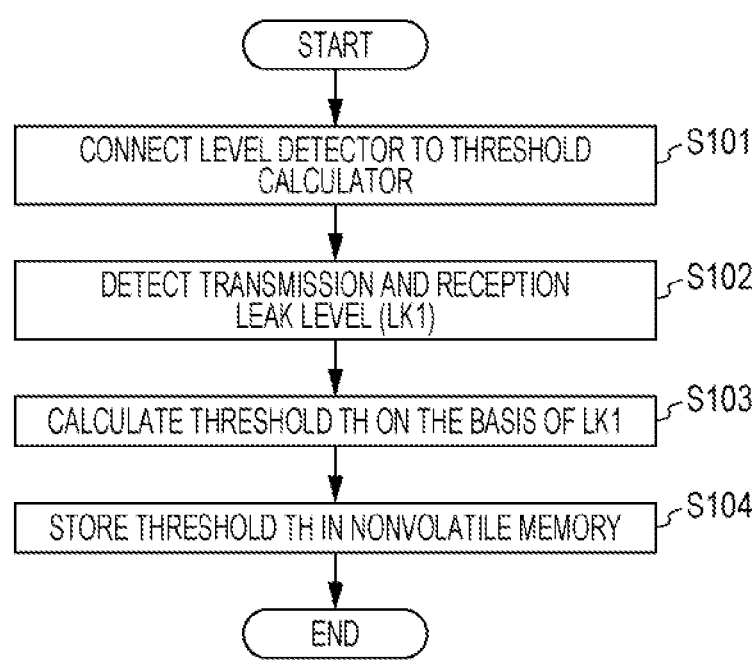
FIG. 3 is a flow chart showing an example of the threshold calculation process according to the embodiment of the present disclosure.

FIG. 3 is a flow chart showing an example of the threshold calculation process according to the present embodiment. The threshold calculation process shown in FIG. 3 is executed in the preparatory mode, in which the receiving antenna 16 does not receive a reflected wave from the bumper 2 or a reflected wave from the target 3.

For example, the threshold calculation process is executed before the radar module 1 is mounted on the vehicle, i.e. before the radar module 1 is shipped from a manufacturing factory in which it was manufactured.

First, in accordance with an instruction from the output controller 22, the switch 232 connects the level detector 231 to the threshold calculator 233 (S101).

After S101, the level detector 231 detects the transmission and reception leak signal level LK1 (S102).

After S102, the threshold calculator 233 calculates the threshold TH on the basis of the transmission and reception leak signal level LK1 (S103).

After S103, the threshold calculator 233 stores the threshold TH thus calculated in the nonvolatile memory 234 (S104).

The threshold calculation process described above allows the level detector 231 to detect a transmission and reception leak signal level in the preparatory mode, in which the bumper 2 and the target 3 are absent, and allows the threshold calculator 233 to calculate the threshold on the basis of the transmission and reception leak signal level thus detected.

Next, the flow of the state determination process (inspection mode) is described with reference to FIG. 4.

Figure 4:
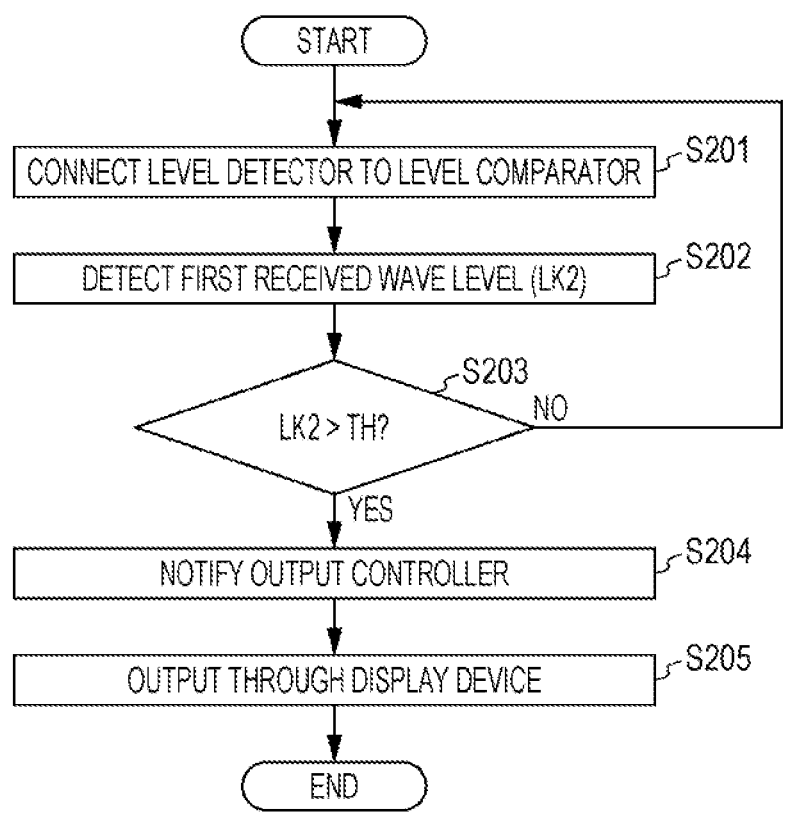
FIG. 4 is a flow chart showing an example of the state determination process according to the embodiment of the present disclosure.

FIG. 4 is a flow chart showing an example of the state determination process according to the present embodiment. The state determination process shown in FIG. 4 is executed when the driver or the like of the vehicle on which the radar module 1 is mounted starts the engine.

First, in accordance with an instruction from the output controller 22, the switch 232 connects the level detector 231 to the level comparator 235 (S201).

After S201, the level detector 231 detects the second wave signal level LK2 (S202).

After S202, the level comparator 235 reads out the threshold TH from the nonvolatile memory 234 and determines whether the second wave signal level LK2 is higher than the threshold TH (S203).

In a case where the second wave signal level LK2 is equal to or lower than the threshold TH (NO in S203), S201 is executed again.

In a case where the second wave signal level LK2 is higher than the threshold TH (YES in S203), the level comparator 235 notifies the output controller 22 of a determination result indicating the presence of a bad bumper state (S204). The output controller 22 outputs, to the display device 4, the determination result of which the output controller 22 was notified.

After S204, the display device 4 outputs the determination result acquired from the output controller 22. Then, the state determination process ends.

It should be noted that although FIG. 4 shows that S201 is executed again in a case where the second wave signal level LK2 is equal to or lower than the threshold TH (NO in S203), the present disclosure is not limited to this. In a case where the second wave signal level LK2 is equal to or lower than the threshold TH, the state determination process may end without S201 being executed again. Then, the state determination process shown in FIG. 4 may be started again when the driver or the like of the vehicle on which the radar module 1 is mounted starts the engine.

As described above, the present embodiment makes it possible to determine the intensity of a reflection from a bumper by comparing the level of the second wave signal, which is a combination of a transmission and reception leak signal and a bumper-reflected wave signal, with the threshold. This configuration makes it possible to detect a bad bumper state that becomes a factor in degrading the performance of the radar apparatus.

Further, according to the present embodiment, the bumper state determiner 23 calculates the threshold in a state (preparatory mode) in which no bumper is present. This configuration makes it possible to calculate the threshold on the basis of the level of a transmission and reception leak signal including no reflected wave reflected by a bumper, thus making it possible to determine the presence or absence of a bad bumper state with a high degree of accuracy. Further, this configuration makes it possible to calculate the threshold before the radar module 1 is mounted on the vehicle, thus eliminating the need to perform a process after the radar module 1 has been mounted on the vehicle.

It should be noted that, in the present embodiment, the transmission processor of the radar module 1 may have a function of performing transmission beam forming through an adaptive array and switching the direction of transmission of first wave signals among a plurality of directions.

Upon acquiring an instruction to perform the threshold calculation process, the transmission processor transmits first wave signals in sequence while switching the direction of transmission among the plurality of directions. Then, the reception processor generates delay profiles from received waves in response to each separate one of the first wave signals transmitted in sequence and outputs the delay profiles to the level detector 231 of the bumper state determiner 23.

The level detector 231 detects transmission and reception leak signal levels from the delay profiles of the received waves and outputs the transmission and reception leak signal levels to the threshold calculator 233. The threshold calculator 233 determines the lowest one of the transmission and reception levels, selects a direction of transmission corresponding to the lowest transmission and reception leak signal level, and outputs the direction of transmission to the output controller 22. Further, the threshold calculator 233 calculates the threshold on the basis of the lowest transmission and reception leak signal level and stores the threshold thus calculated in the nonvolatile memory 234.

Then, in the state determination process, the output controller 22 outputs, to the transmission processor, an instruction to perform the state determination process and information concerning the direction of transmission selected by the threshold calculator 233. The transmission processor transmits a first wave signals in the direction of transmission selected by the threshold calculator 233.

As a result, in the state determination process, the level detector 231 detects the second wave signal level included in the delay profile of a received wave in response to a first wave signals transmitted in such a direction of transmission that the lowest transmission and reception leak signal level is attained in a state in which the bumper 2 is absent. Then, the level comparator 235 can compare the second wave signal level acquired from the level detector 231 with the threshold calculated on the basis of the lowest transmission and reception leak signal level attained in a state (preparatory mode) in which the bumper 2 is absent and determine the presence or absence of a bad bumper state.

This configuration makes it possible to prevent an error from occurring in the state determination process when the second wave signal is smaller than the bumper-reflected wave signal contrary to the assumption in the event of accidental occurrence of a case where, in the state determination process, the transmission and reception leak signal and the reflected wave reflected by the bumper are close in amplitude level to each other and almost opposite in phase to each other.

Further, although the present embodiment has been described with reference to an example in which the output controller 22 acquires a determination result (first determination result) indicating the presence of a bad bumper state and outputs the determination result thus acquired, the present disclosure is not limited to this example. For example, the output controller 22 may acquire, from an adherent determiner (not illustrated), a determination result (second determination result) indicating the presence of an adherent to the bumper and output the determination result. In this case, the output controller 22 outputs the first determination result and the second determination result, distinguishing the two. For example, the output controller 22 outputs an error code indicating the first determination result and an error code indicating the second determination result as different error codes. In a case where the output controller 22 outputs the first determination result out of the first and second determination results, the output controller 22 can determine that the bumper is abnormal. In a case where the output controller 22 outputs the second determination result out of the first and second determination results, the output controller 22 can determine the presence of an adherent that does not affect the radar apparatus. In a case where the output controller 22 outputs both the first and second determination results, the output controller 22 can determine that the radar apparatus is affected by an adherent.

This configuration allows the display device 4, which is the destination of output from the output controller 22, to display the first determination result and the second determination result in distinction from each other, allowing the driver or the like to make a distinction between differences in error. For this reason, in a case where the first determination result and the second determination result are obtained, the change in level of the second wave signal can be judged as attributable to the influence of the adherent; therefore, the operation of the radar apparatus can be resumed by removing the adherent. Moreover, in a case where the first determination result out of the first and second determination results is obtained, the operation of the radar apparatus can be suspended for consideration of repair of the bumper.

It should be noted that although the present embodiment has been described with reference to an example in which the bumper state determiner 23 of the radar module 1 includes the threshold calculator 233 that calculates the threshold, the present disclosure is not limited to this example. The threshold does not need to be calculated by an internal component of the radar module 1. For example, the threshold may be calculated by a test radar module in advance and stored in the nonvolatile memory 234. Alternatively, the threshold may be calculated by a computer simulation or the like in advance and stored in the nonvolatile memory 234.

In the foregoing, various embodiments have been described with reference to the drawings. However, the present disclosure is of course not limited to such examples. It is apparent that persons skilled in the art can conceive of various changes and alterations within the scope of claims, and such changes and alterations are naturally understood as pertaining to the technical scope of the present disclosure. Each constituent element in the embodiment described above may be arbitrarily combined with the other without departing from the spirit of the disclosure.

SUMMARY OF THE EMBODIMENT

A radar apparatus according to a first aspect of the present disclosure includes: a transmission processor, provided inside of a bumper of a vehicle, which transmits first wave signals from inside of the bumper toward outside; a reception processor that receives an object-reflected wave signal that is a reflection of the first wave signals by a target in an area around the vehicle, a bumper-reflected wave signal that is a reflection of the first wave signals by the bumper, and a transmission and reception leak signal of the first wave signals and detects the target through the object-reflected wave signal; and a bumper determiner that detects a first reception level of a second wave signal including the bumper-reflected wave signal and the transmission and reception leak signal, compares the first reception level with a threshold, and determines the presence of a bad bumper state in a case where the first reception level is higher than the threshold.

A radar apparatus according to a second aspect of the present disclosure is the radar apparatus according to the first aspect, wherein the bumper determiner calculates the threshold on the basis of a reception level of the transmission and reception leak signal of the second wave signal.

A radar apparatus according to a third aspect of the present disclosure is the radar apparatus according to the second aspect, wherein the transmission processor switches the first wave signals among a plurality of directions of transmission by beam forming, and the bumper determiner selects such a direction as a direction of transmission of the transmission processor that the reception level of the transmission and reception leak signal of the second wave signal is lowest.

A radar apparatus according to a fourth aspect of the present disclosure is the radar apparatus according to any of the first to third aspects, further including: an adherent determiner that determines the presence or absence of extraneous matter having adhered to the bumper; and an output controller that determines the presence or absence of the bad bumper state with reference to a determination result yielded by the bumper determiner and a determination result yielded by the adherent determiner.

A bumper state determination method according to a fifth embodiment of the present disclosure includes: transmitting first wave signals from inside of a bumper of a vehicle toward outside; receiving an object-reflected wave signal that is a reflection of the first wave signals by a target in an area around the vehicle, a bumper-reflected wave signal that is a reflection of the first wave signals by the bumper, and a transmission and reception leak signal of the first wave signals; detecting the target through the object-reflected wave signal; detecting a first reception level of a second wave signal including the bumper-reflected wave signal and the transmission and reception leak signal; comparing the first reception level with a threshold; and determining the presence of a bad bumper state in a case where the first reception level is higher than the threshold.

Although the embodiment described above has been described by giving an example where the present disclosure is configured with hardware, the present disclosure may alternatively be achieved with software in cooperation with hardware.

Further, the functional blocks used in the description of the embodiment above are typically achieved as LSIs, i.e. integrated circuits each having an input terminal and an output terminal. These LSIs may take the form of individual single chips or of a single chip including some or all of them. Depending on the degree of integration, the LSIs may alternatively be referred to as "ICs", "system LSIs", "super LSIs", or "ultra LSIs".

Further, the method for integrating circuits is not limited to LSI, but may be achieved with dedicated circuits or general-purpose processors. An FPGA (field programmable gate array) that can be programmed after manufacturing of an LSI or a reconfigurable processor that allows reconfiguration of the connection or setup of circuit cells inside the LSI may be utilized.

Furthermore, if an advance in semiconductor technology or a derivative technology gives rise to an integrated-circuit technology that replaces LSI, the technology may of course be employed to integrate the functional blocks. Possibilities include the application of biotechnology and the like.

The present disclosure may be used in a radar system that is mounted on a vehicle.

What is claimed is:

1. A radar apparatus comprising:
   a transmission processor, which, in operation, transmits first wave signals from inside of a bumper of a vehicle toward outside of the vehicle, the transmission processor being positioned inside of the bumper;
   a reception processor, which, in operation,
      receives an object-reflected wave signal that is a reflection of the first wave signals by a target in an area around the vehicle, a bumper-reflected wave signal that is a reflection of the first wave signals by the bumper, and a transmission and reception leak signal that is at least one of the first wave signals transmitted from the transmission processor, and
      detects the target based on the object-reflected wave signal; and
   a bumper state determiner, which, in operation, detects a first reception level of a second wave signal including the bumper-reflected wave signal and the transmission and reception leak signal, calculates a threshold on a basis of a reception level of a previous transmission and reception leak signal, compares the first reception level to the threshold, and determines a presence of a bad bumper state in a case where the first reception level is higher than the threshold.

2. The radar apparatus according to claim 1, wherein the bumper state determiner, in operation, selects a transmission direction having a lowest reception level of the transmission and reception leak signal of the second wave signal among a plurality of transmission directions used in beam forming,
   the transmission processor, in operation, switches the selected transmission direction.

3. The radar apparatus according to claim 1, further comprising:
   an adherent determiner, which, in operation, determines the presence or absence of extraneous matter having adhered to the bumper; and
   an output controller, which, in operation, determines the presence or absence of the bad bumper state with reference to a determination result yielded by the bumper siatc determiner and a determination result yielded by the adherent determiner.

4. The radar apparatus according to claim 1 wherein the reception processor receives the transmission and reception leak signal directly from the transmission processor.

5. The radar apparatus according to claim 1 wherein the bad bumper state is a state in which the bumper has been damaged.

6. A bumper state determination method comprising:
   transmitting first wave signals from inside of a bumper of a vehicle toward outside of the vehicle;
   receiving an object-reflected wave signal that is a reflection of the first wave signals by a target in an area around the vehicle, a bumper-reflected wave signal that is a reflection of the first wave signals by the bumper, and a transmission and reception leak signal that is at least one of the first wave signals;
   detecting the target based on the object-reflected wave signal;
   detecting a first reception level of a second wave signal including the bumper-reflected wave signal and the transmission and reception leak signal;
   calculates a threshold on a basis of a reception level of a previous transmission and reception leak signal,
   comparing the first reception level to the threshold; and
   determining a presence of a bad bumper state in a case where the first reception level is higher than the threshold.

* * * * *